(12) United States Patent
Erimli et al.

(10) Patent No.: US 7,079,533 B1
(45) Date of Patent: Jul. 18, 2006

(54) SYSTEMS AND METHODS FOR BYPASSING PACKET LOOKUPS

(75) Inventors: Bahadir Erimli, Campbell, CA (US); Yatin R. Acharya, Sunnyvale, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 848 days.

(21) Appl. No.: 09/846,280

(22) Filed: May 2, 2001

(51) Int. Cl.
*H04L 12/54* (2006.01)

(52) U.S. Cl. .................. 370/389; 370/412; 370/428; 711/149; 711/150

(58) Field of Classification Search ............... 370/389, 370/392, 412, 428, 429, 463, 229, 230, 231, 370/235, 236; 709/232, 238, 250; 711/100, 711/147, 149, 150, 202, 221, 216
See application file for complete search history.

(56) References Cited

U.S. PATENT DOCUMENTS

| | | | | |
|---|---|---|---|---|
| 6,084,878 | A * | 7/2000 | Crayford et al. | 370/389 |
| 6,104,696 | A * | 8/2000 | Kadambi et al. | 370/218 |
| 6,115,378 | A * | 9/2000 | Hendel et al. | 370/392 |
| 6,115,387 | A * | 9/2000 | Egbert et al. | 370/423 |
| 6,335,935 | B1 * | 1/2002 | Kadambi et al. | 370/396 |
| 6,430,661 | B1 * | 8/2002 | Larson et al. | 711/158 |
| 6,445,709 | B1 * | 9/2002 | Chiang | 370/399 |
| 6,483,844 | B1 * | 11/2002 | Erimli | 370/428 |
| 6,529,503 | B1 * | 3/2003 | Chiang et al. | 370/363 |
| 6,570,875 | B1 * | 5/2003 | Hegde | 370/389 |
| 6,577,636 | B1 * | 6/2003 | Sang et al. | 370/395.7 |
| 6,658,015 | B1 * | 12/2003 | Merchant et al. | 370/422 |
| 2001/0012294 | A1 * | 8/2001 | Kadambi et al. | 370/391 |
| 2002/0054604 | A1 * | 5/2002 | Kadambi et al. | 370/419 |
| 2002/0196796 | A1 * | 12/2002 | Ambe et al. | 370/401 |

* cited by examiner

*Primary Examiner*—Alpus H. Hsu
(74) *Attorney, Agent, or Firm*—Harrity Snyder, LLP

(57) ABSTRACT

A network device determines forwarding information for received data frames. The network device includes input ports, queuing logic, a forwarding engine, and a port filter. The input ports receive data frames. The queuing logic transfers at least some of the received data frames to an external memory. The forwarding engine generates forwarding information for at least some of the data frames transferred by the queuing logic to the external memory. The port filter stores forwarding information for one or more of the received data frames and analyzes each of the received data frames to determine whether there is stored forwarding information related to the received data frame. When there is stored forwarding information related to the received data frame, the port filter uses the stored forwarding information to forward the received data frame.

16 Claims, 4 Drawing Sheets

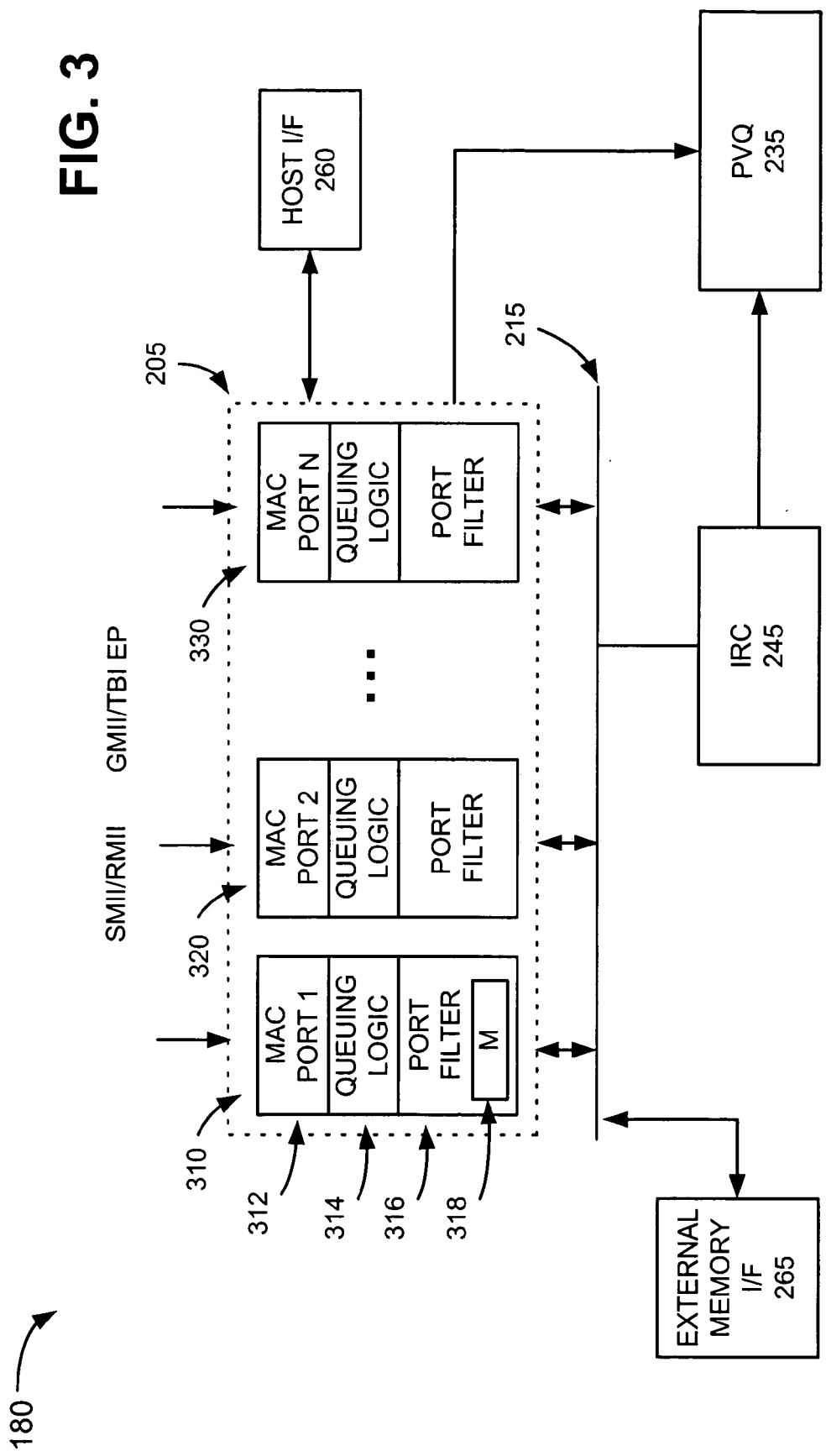

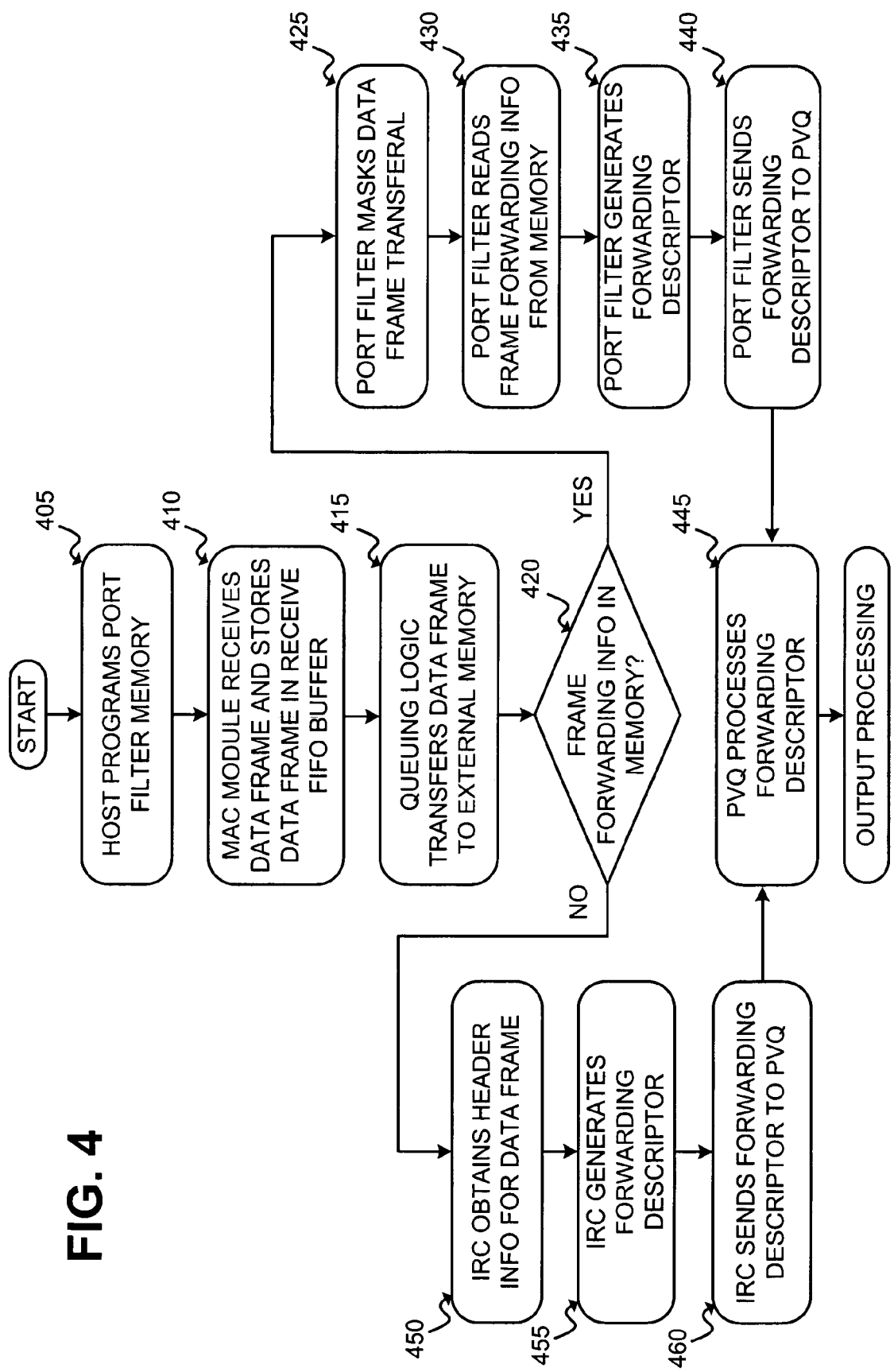

SYSTEMS AND METHODS FOR BYPASSING PACKET LOOKUPS

TECHNICAL FIELD

The present invention relates generally to communication systems and methods and, more particularly, to systems and methods for bypassing generation of packet forwarding information for certain related packets.

BACKGROUND ART

In computer networks, a number of network stations are typically interconnected via a communications medium. For example, Ethernet 802.3 is a commonly used local area network (LAN) scheme in which multiple stations are connected to a shared or dedicated serial data path. These stations often communicate with a switch or some other network device located between the data path and the stations connected to that path. The switch typically controls the communication of packets and includes logic for receiving and forwarding packets to their appropriate destinations.

Conventional network switches typically include a forwarding engine that operates upon received packets to determine forwarding and other relevant information for the packets. For example, the forwarding engine may perform complex and time-consuming lookup operations to identify the output port to transmit a received packet, the priority of a received packet, and other forwarding information relating to a received packet.

In some conventional switches, the process for determining forwarding information includes analyzing packet header information to generate the forwarding information for the packet. The forwarding engine, in this case, determines the forwarding information for each received packet separately.

DISCLOSURE OF THE INVENTION

There exists a need for systems and methods that facilitate the determination of packet forwarding information by taking advantage of the fact that certain packets are related to other packets, such as packets exchanged between two endpoints. Systems and methods consistent with the present invention address this and other needs by using programmed forwarding information for certain packets, thereby eliminating the need for complex and time-consuming lookups for these packets. This improves the efficiency and throughput of a network switch.

Additional advantages and other features of the invention will be set forth in part in the description that follows and in part will become apparent to those having ordinary skill in the art upon examination of the following or may be learned from the practice of the invention. The advantages and features of the invention may be realized and obtained as particularly pointed out in the appended claims.

According to the present invention, the foregoing and other advantages are achieved in part by a network device that determines forwarding information for received data frames. The network device includes input ports, queuing logic, a forwarding engine, and a port filter. The input ports receive data frames. The queuing logic transfers at least some of the received data frames to an external memory. The forwarding engine generates forwarding information for at least some of the received data frames transferred by the queuing logic to the external memory. The port filter stores forwarding information for one or more of the received data frames and analyzes each of the received data frames to determine whether there is stored forwarding information relating to the received data frame. When there is stored forwarding information relating to the received data frame, the port filter uses the stored forwarding information to forward the received data frame.

In another implementation consistent with the present invention, a method determines forwarding information for a data frame received by a network device. The method includes programming a memory to store forwarding information for one or more data frames; receiving a plurality of data frames; analyzing each of the received data frames to determine whether the received data frame corresponds to one of the one or more data frames; and using the stored forwarding information to forward the received data frame when the received data frame corresponds to one of the one or more data frames.

In yet another implementation consistent with the present invention, a multiport network device includes a memory, a lookup table, input ports, queuing logic, and a forwarding engine. The memory stores forwarding information associated with one or more data frames. The lookup table stores identifying information relating to the one or more data frames. The input ports receive data frames. The queuing logic transfers at least some of the received data frames to an external memory. The forwarding engine generates forwarding information for at least some of the data frames transferred by the queuing logic to the external memory. The port filter compares a portion of each of the received data frames to the identifying information stored in the lookup table to determine whether the received data frame is related to one of the one or more data frames for which the memory stores forwarding information. When the received data frame is related to one of the one or more data frames, the port filter prevents the forwarding engine from generating forwarding information for the received data frame and uses the stored forwarding information to forward the received data frame.

Other advantages and features of the present invention will become readily apparent to those skilled in this art from the following detailed description. The embodiments shown and described provide illustration of the best mode contemplated for carrying out the invention. The invention is capable of modifications in various obvious respects, all without departing from the invention. Accordingly, the drawings are to be regarded as illustrative in nature, and not as restrictive.

BRIEF DESCRIPTION OF THE DRAWINGS

Reference is made to the attached drawings, where elements having the same reference number designation represent like elements throughout.

FIG. 3 is a diagram of a portion of the multiport switch of FIG. 2 according to an implementation consistent with the present invention; and FIG. 4 is a flowchart of exemplary processing for determining frame forwarding information for a data frame received by the multiport switch of FIG. 2 according to an implementation consistent with the present invention.

BEST MODE FOR CARRYING OUT THE INVENTION

The present invention will be described with the example of a switch in a packet switched network, such as an Ethernet (IEEE 802.3) network. It will become apparent, however, that the present invention is also applicable to other packet switched systems, as described in detail below, as well as to other types of systems in general.

Switch Architecture Overview

Figure 1:
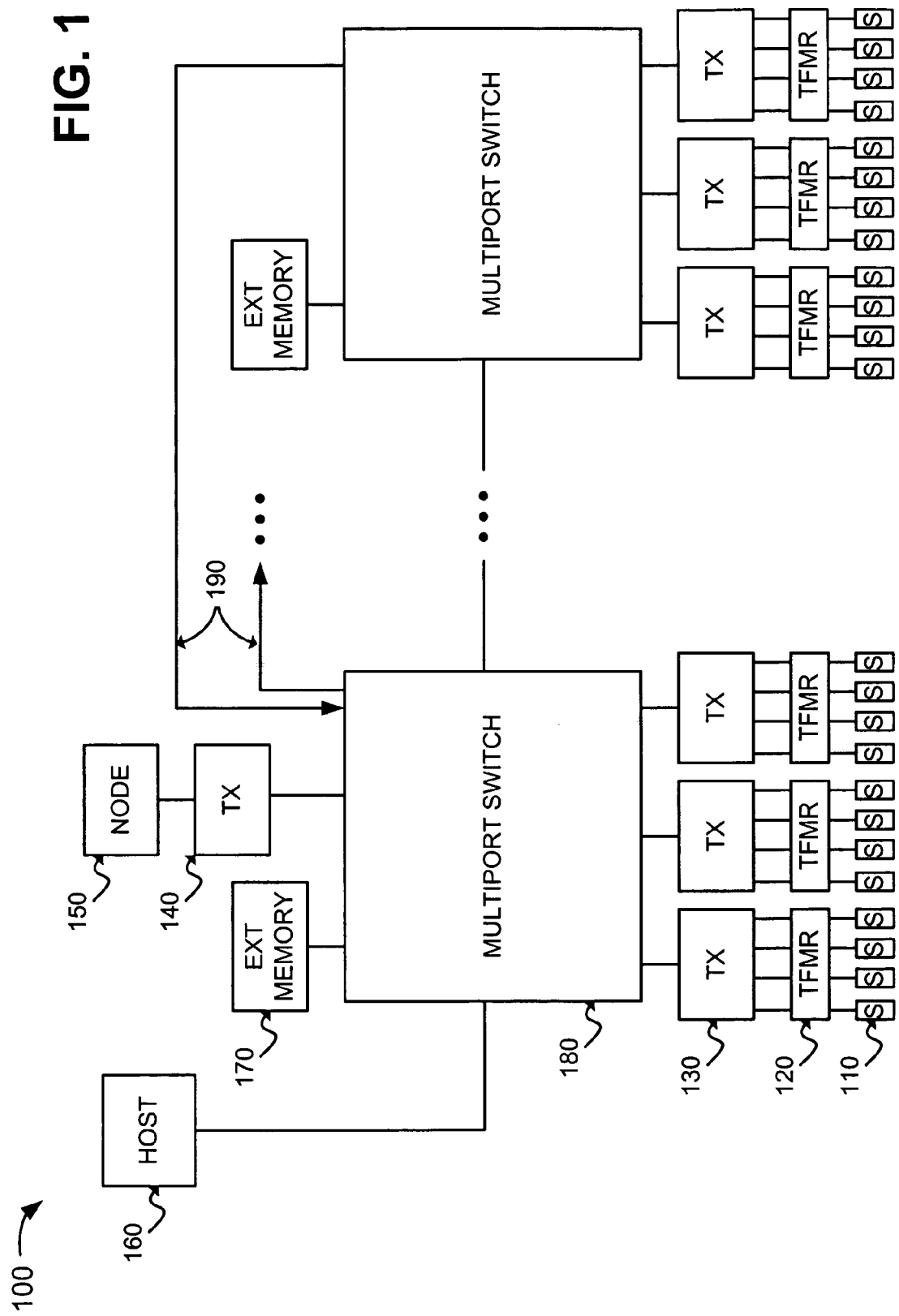
FIG. 1 is a block diagram of an exemplary system in which systems and methods consistent with the present invention may be implemented.

FIG. 1 is a block diagram of an exemplary system in which systems and methods consistent with the present invention may be implemented. The exemplary system may include a packet switched network 100, such as an Ethernet (IEEE 802.3) network. The packet switched network 100 may include network stations 110, transformers 120, transceivers 130 and 140, a network node 150, a host 160, external memories 170, and multiport switches 180. The network stations 110 may include conventional communication devices, such as computers, with different configurations. For example, the devices may send and receive data at network data rates of 10 megabits per second (Mb/s) or 100 Mb/s.

Each 10/100 Mb/s network station 110 may send and receive data to and from a multiport switch 180 according to either a half-duplex or full duplex Ethernet protocol. The Ethernet protocol ISO/IEC 8802-3 (ANSI/IEEE Std. 802.3, 1993 Ed.) defines a half-duplex media access mechanism that permits all stations 110 to access the network channel with equality. Traffic in a half-duplex environment may not be distinguished over the transmission medium. Rather, each half-duplex station 110 may include an Ethernet interface card that uses carrier-sense multiple access with collision detection (CSMA/CD) to listen for traffic on the transmission medium. The absence of network traffic is detected by sensing deassertion of a receive carrier on the transmission medium.

Any station 110 having data to send may attempt to access the channel by waiting a predetermined amount of time, known as the interpacket gap interval (IPG), after deassertion of the receive carrier on the transmission medium. If multiple stations 110 are connected to the same link, each of the stations 110 may attempt to transmit data in response to the sensed deassertion of the receive carrier and after the IPG interval, possibly resulting in a collision. Hence, the transmitting station 110 may monitor the transmission medium to determine if there has been a collision due to another station 110 sending data on the same link at the same time. If a collision is detected, both stations 110 cease transmitting, wait a random amount of time, and then retry the transmission.

The 10/100 Mb/s network stations 110 that operate in full duplex mode may send and receive data packets according to the Ethernet standard IEEE 802.3u. The full duplex environment provides a two-way, point-to-point communication link enabling simultaneous transmission and reception of data packets between each link partner (i.e., the 10/100 Mb/s network station 110 and the corresponding multiport switch 180).

The transformers 120 may include magnetic transformers that provide AC coupling between the network stations 110 and the transceivers 130. The transceivers 130 may include 10/100 Mb/s physical layer transceivers that communicate with the multiport switches 180 via respective serial media independent interfaces (SMIIs) or reduced media independent interfaces (RMIIs). Each of the transceivers 130 may be configured to send and receive data packets between the multiport switch 180 and up to four network stations 110 via the SMII/RMII. The SMII/RMII may operate at a data rate sufficient to enable simultaneous transmission and reception of data packets by each of the network stations 110 and the corresponding transceiver 130.

The transceiver 140 may include one or more 1000 Mb/s (i.e., 1 Gb/s) physical layer transceivers that provide communication with nodes, such as the network node 150, via, for example, a high speed network transmission medium. The network node 150 may include one or more 1 Gb/s network nodes that send and receive data packets at a network speed of 1 Gb/s. The network node 150 may include, for example, a server or a gateway to a high-speed backbone network.

The host 160 may include a computer device that provides external management functions to control the overall operation of the multiport switches 180. The external memories 170 may include synchronous static random access memories (SSRAMs) that provide external storage for the multiport switches 180. Each of the external memories 170 may include a Joint Electron Device Engineering Council (JEDEC) pipelined burst or Zero Bus Turnaround (ZBT) SSRAM having a 64-bit wide data path and a 17-bit wide address path. The external memories 170 may be addressable as upper and lower banks of 128K in 64-bit words. The size of the external memories 170 is preferably at least 1 Mbyte with data transfers possible on every clock cycle through pipelining.

The multiport switches 180 selectively forward data packets received from the network stations 110 or the network node 150 to the appropriate destination according to the appropriate transmission protocol, such as the Ethernet protocol. The multiport switches 180 may be cascaded together (via lines 190) to expand the capabilities of the multiport switches 180.

Figure 2:
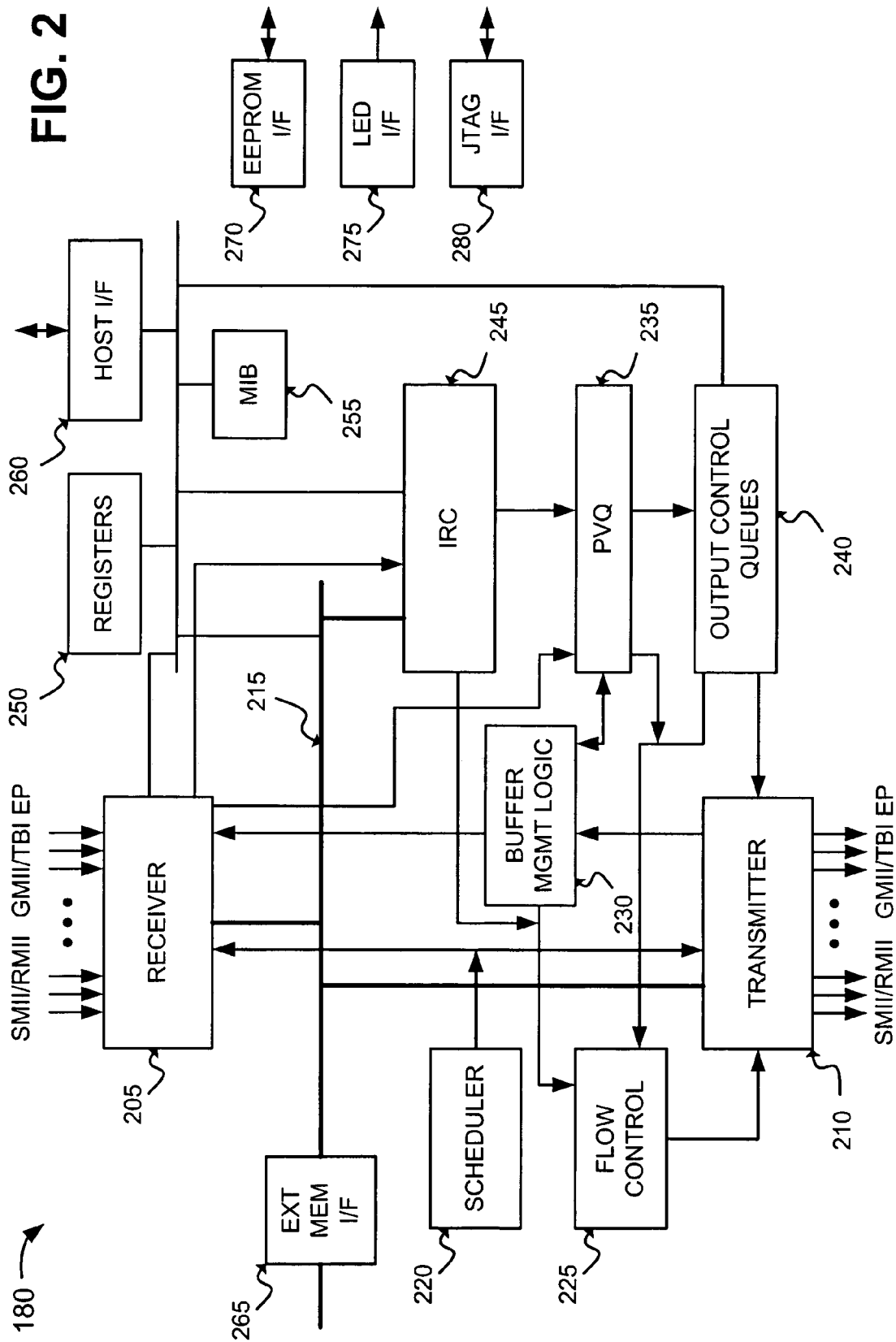
FIG. 2 is a detailed diagram of a multiport switch of FIG. 1 according to an implementation consistent with the present invention.

FIG. 2 is a detailed diagram of the multiport switch 180 according to an implementation consistent with the present invention. The multiport switch 180 may include a receiver 205, a transmitter 210, a data bus 215, a scheduler 220, flow control logic 225, buffer management logic 230, a port vector queue (PVQ) 235, token bucket logic 238, output control queues 240, an internal rules checker (IRC) 245, registers 250, management information base (MIB) counters 255, a host interface (I/F) 260, an external memory interface 265, an EEPROM interface 270, an LED interface 275, and a Joint Test Action Group (JTAG) interface 280.

The receiver 205 may include media access control (MAC) modules and receive buffers, such as first-in, first-out (FIFO) buffers. The receive modules may include input ports that support SMIIs, RMIIs, gigabit media independent interfaces (GMIIs), ten bit interfaces (TBIs), and proprietary interfaces for expansion with other multiport switches 180 (FIG. 1). The expansion ports (EPs) may be used to transfer data between other multiport switches 180 according to a prescribed protocol. The expansion ports may permit the multiport switches 180 to be cascaded together to form a backbone network. Each of the receive modules may include queuing logic that receives data packets from the network stations 110 and/or network node 150 and stores the packets in the corresponding receive FIFOs. The queuing logic may then send portions of the packets to the IRC 245 for processing and to the external memory 170 for storage via the external memory interface 265.

The transmitter 210 may include MAC modules and transmit buffers, such as FIFO buffers. The transmit modules may include output ports that support SMIIs, GMIIs, TBIs, and proprietary interfaces for expansion with other multiport switches 180. Each of the transmit modules may include dequeuing logic that obtains packets from the external memory 170 and stores the packets in the corresponding transmit FIFOs. The transmit modules may read the data packets from the corresponding transmit FIFOs and transmit the packets to the network stations 1110 and/or network node 150. In an alternative implementation consistent with the present invention, the functions of the receiver 205 and transmitter 210 may be performed by a transceiver that manages both the receiving and transmitting of data packets.

The data bus 215 may include one or more conductors that connect the receiver 205, the transmitter 210, the IRC 245, and the external memory interface 265. The scheduler 220 may include logic that controls access to the external memory 170 by the queuing and dequeuing logic of the receiver 205 and transmitter 210, respectively. The multiport switch 180 is configured to operate as a non-blocking switch, where network data is received and transmitted from the switch ports at the respective wire rates of 10, 100, or 1000 Mb/s. Hence, the scheduler 220 may control the access by different ports to optimize use of the bandwidth of the external memory 170.

The flow control logic 225 may include logic that operates in conjunction with the buffer management logic 230, the PVQ 235, and the output control queues 240 to control the transmission of packets by the transmitter 210. The flow control logic 225 may control the transmitter 210 so that the transmitter 210 outputs packets in an efficient manner based on the volume of data traffic. The buffer management logic 230 may include logic that oversees the use of memory within the multiport switch 180. For example, the buffer management logic 230 may manage the use of frame pointers and the reuse of frame pointers once the data packet has been transmitted to its designated output port(s). Frame pointers identify the location of data frames stored in the external memory 170 that require transmission.

The PVQ 235 may include logic that obtains a frame pointer to the appropriate output queue(s) in output control queues 240 that correspond to the output ports to receive the data frame transmission. For multicopy frames, the PVQ 235 may supply multiple copies of the same frame pointer to more than one output queue.

The output control queues 240 may include a FIFO-type output queue corresponding to each of the transmit modules in the transmitter 210. Each of the output queues may include multiple priority queues for frames having different levels of priority. For example, a high priority queue may be used for frames that require a lower access latency (e.g., frames for multimedia applications or management frames). The frame pointers stored in the FIFO-type output queues may be processed by the dequeuing logic for the respective transmit modules. The dequeuing logic uses the frame pointers to access the external memory 170 to read data frames at the memory locations specified by the frame pointers.

The IRC 245 may include an internal decision making engine that makes frame forwarding decisions for data packets that are received by the receiver 205. The IRC 245 may monitor (i.e., "snoop") the data bus 215 to determine the frame pointer value and a part of the data frame, for example, the header information of a received packet, including the source, destination, and virtual local area network (VLAN) address information. The IRC 245 may use the header information to determine which output port will output the data frame stored at the location specified by the frame pointer. The IRC 245 may, thus, determine that a given data frame should be output by either a single port (i.e., unicast), multiple ports (i.e., multicast), all ports (i.e., broadcast), or no port (i.e., discarded).

For example, each data frame may include a header that identifies the source and destination addresses. The IRC 245 may use the destination address to identify the appropriate output port to output the data frame. The frame header may also include VLAN address information that identifies the frame as information destined to one or more members of a group of network stations 110. The IRC 245 may alternatively determine that a data frame should be transferred to another multiport switch 180 via the expansion port. Therefore, the IRC 245 determines whether a frame temporarily stored in the external memory 170 should be output to a single output port, multiple output ports, no output port, or another multiport switch 180.

The IRC 245 may output its forwarding decision to the PVQ 235 in the form of a forwarding descriptor. The forwarding descriptor may include, for example, a priority class identifying whether the data frame is high priority or low priority, a port vector identifying each output port that should transmit the frame, the input port number, or VLAN information. The PVQ 235 may decode the forwarding descriptor to obtain the frame pointer. The PVQ 235 may then supply the frame pointer to the appropriate output queues within the output control queues 240.

The IRC 245 may also perform layer 3 filtering. For example, the IRC 245 may examine each received data packet for up to 128 programmable patterns and process the packet based on the result. The result may dictate that the IRC 245 drop the packet, forward the packet to the host 160, or assign a user priority or a Differentiated Services Code Point (DSCP) to the packet. User priorities and the DSCP may be independently mapped into output priority classes.

The registers 250 may include configuration and status registers used by the host interface 260. The MIB counters 255 may provide statistical network information in the form of MIB objects for use by the host 160. The host interface 260 may include a standard interface that permits an external management entity, such as the host 160, to control the overall operation of the multiport switch 180. The host interface 260 may decode host accesses within a prescribed register space and read and write configuration and status information to and from the registers 250.

The external memory interface 265 may include a standard interface that permits access to the external memory 170. The external memory interface 265 may permit external storage of packet data in the external memory 170 in a direct memory access (DMA) transaction during an assigned time slot determined by the scheduler 220. In an implementation consistent with the present invention, the external memory interface 265 operates at a clock frequency of at least 66 MHz and, preferably, at a frequency of 100 MHz or above.

The EEPROM interface 270 may include a standard interface to another external memory, such as an EEPROM. The LED interface 275 may include a standard interface to external LED logic. The LED interface 275 may send the status of conditions of the input and output ports to the external LED logic. The LED logic may drive LED display elements that are human-readable. The JTAG interface 280 may include a standard interface to external testing equipment to permit, for example, a boundary scan test to be performed on the multiport switch 180.

The foregoing description of the switch architecture provides an overview of the switch operations in a packet switched network. A more detailed description of the features of the present invention as embodied, for example, in the multiport switch 180 is provided below.

Exemplary Receiver Processing Logic

The present invention is directed to a port filter that uses programmed frame forwarding information for certain data frames to alleviate the need for the IRC 245 to perform the complex and time-consuming lookups to determine this information, thereby reducing the load on the IRC 245 and increasing the throughput of the multiport switch 180.

FIG. 3 is a detailed diagram of a portion of the multiport switch 180 according to an implementation consistent with the present invention. The portion of the multiport switch 180 shown in FIG. 3 includes the receiver 205, the data bus 215, the PVQ 235, the IRC 245, the host interface 260, and the external memory interface 265. The receiver 205 may include MAC modules 310, 320, and 330 corresponding to input ports 1 through N, respectively. Each MAC module may include a receive FIFO buffer, queuing logic, and a port filter. For example, referring to FIG. 3, MAC module 310 may include a receive FIFO buffer 312, queuing logic 314, and port filter 316. The other MAC modules 320 and 330 may similarly include receive FIFO buffers, queuing logic, and port filters.

The receive FIFO buffer 312 may include a FIFO that temporarily buffers data frames received on the corresponding input port. The queuing logic 314 may include logic responsible for transferring data frames from the receive FIFO buffer 312 to the external memory 170 (FIG. 1) via the external memory interface 265. The port filter 316 may include logic for determining frame forwarding information associated with certain received data frames. The port filter 316 may include a memory 318 programmable by the host 160, for example, via the host interface 260. The memory 318 may store frame forwarding information, such as priority, transmit port, receive port, and VLAN information, for one or more data frames and a flexible lookup table. The lookup table may permit the port filter 316 to identify certain data frames as data frames for which it contains frame forwarding information. The port filter 316 may compare one or more portions of a received data frame to the contents on the lookup table and, if there is a match, then the memory 318 stores frame forwarding information for the data frame.

When the port filter 316 identifies one of these data frames for which it has frame forwarding information, it may read the frame forwarding information from its memory 318 and send the frame forwarding information related to the data frame, possibly in a form similar to the forwarding descriptor generated by the IRC 245, to the PVQ 235. The port filter 316 may also "blind" the IRC snooping on the bus 215. In other words, the port filter 316 may mask the transferal of the data frame to the external memory 170 by the queuing logic 314 to cause the IRC 245 to ignore the header information of the data frame and thereby bypass performing its normal frame forwarding information lookup operations.

Exemplary Processing

FIG. 4 is a flowchart of exemplary processing for determining frame forwarding information for a data frame received by the multiport switch 180 according to an implementation consistent with the present invention. Processing may begin with the host 160 programming the port filter memory 318 (or, more specifically, the lookup table within the port filter memory 318) via the host interface 260 [act 405]. The host 160 may program the port filter memory 318 with regard to certain related data frames, such as frames relating to point-to-point communications between two stations 110 (FIG. 1). For example, the host 160 may set up a video conference between two stations 110. In this case, the host 160 may program the port filter memory 318 with frame forwarding information, such as the source and destination addresses, the transmit port, receive port, priority, etc., relating to the data frame. The host 160 may also program the port filter memory 318 to facilitate identification of the related data frames by the port filter 316.

Assume that a MAC module, such as the MAC module 310, receives a data frame [act 410]. The MAC module 310 may store the bytes of the data frame, as they are received, in the receive FIFO buffer 312 [act 410]. When at least 64 bytes, for example, of the data frame has been received, the queuing logic 314 may begin transferring the data frame to the external memory 170 via the external memory interface 265 [act 415].

Around this time, the port filter 316 may begin analyzing the data frame stored in the receive FIFO buffer 312. In particular, the port filter 316 may determine whether there is frame forwarding information corresponding to the data frame in the lookup table of the port filter memory 318 [act 420]. To make this determination, the port filter 316 may compare one or more portions of the data frame to information in its lookup table. The port filter 316 may be programmed (possibly by the host 160) to compare any portion of the data frame, such as the source and destination addresses, to the information in the lookup table. When there is a match, the port filter 316 determines that there is forwarding information for the data frame stored in the lookup table of the port filter memory 318.

When the lookup table of the port filter memory 318 stores frame forwarding information relating to the data frame, the port filter 316 may mask the data frame transferal by the queuing logic 314 to the IRC 245 [act 425]. In other words, the port filter 316 may "blind" the IRC snooping on the data bus 215 so that the IRC 245 ignores the data frame transferred by the queuing logic 314 to the external memory 170. For example, in one implementation consistent with the present invention, the queuing logic 314 may set a bit before transferring a data frame to the external memory 170. In this case, the IRC 245 may recognize the bit and ignore the data frame being transferred to the external memory 170. Therefore, the IRC 245 does not initiate its complex and time-consuming lookup operations to determine frame forwarding information for the data frame.

The port filter 316 may read the frame forwarding information that corresponds to the data frame from the lookup table in the port filter memory 318 [act 430]. The port filter 316 may then generate a forwarding descriptor for the data frame [act 435]. In other words, the port filter 316 may gather the frame forwarding information from the port filter memory 318 and put it in a form that resembles the forwarding descriptors generated by the IRC 245. In other implementations consistent with the present invention, the frame forwarding information is stored in the form of a forwarding descriptor in the port filter memory 318.

In either case, the port filter 316 may send the forwarding descriptor to the PVQ 235 [act 440]. The PVQ 235 may then process the forwarding descriptor [act 445]. As described above, the PVQ 235 may use the forwarding descriptor to identify the appropriate output queue(s) in output control queues 240 that correspond to the output port(s) to transmit the data frame and a frame pointer that identifies the location of the data frame in the external memory 170. The PVQ 235 may then store the frame pointer in the identified output queue(s) to await transmission of the data frame from the corresponding output port(s).

Returning to act 420, when the lookup table of the memory 318 stores no frame forwarding information relating to the data frame, the port filter 316 does nothing to mask the transferal of the data frame to the external memory 170 by the queuing logic 314. In this case, the IRC 245 may detect the transferal and read the header information for the data frame [act 450]. The IRC 245 may then perform its lookup operations to generate a forwarding descriptor for the data frame [act 455]. The IRC 245 may send the forwarding descriptor to the PVQ 235 [act 460]. The PVQ 235 may then process the forwarding descriptor, as described above [act 445].

Described have been systems and methods for determining forwarding information for data frames received by the multiport switch 180. By taking advantage of the fact that certain data frames are related, the systems and methods consistent with the present invention may maximize the efficiency and throughput of the multiport switch 180.

Only the preferred embodiments of the invention and a few examples of its versatility are shown and described in the present disclosure. It is to be understood that the invention is capable of use in various other combinations and environments and is capable of modifications within the scope of the inventive concept as expressed herein. For example, while a series of acts has been described with regard to FIG. 4, the order of the acts may differ in other implementations consistent with the present invention.

Also, it has been described that there is a separate port filter 316 for each of the MAC modules 310–330. In other implementations consistent with the present invention, a single port filter operates upon data frames received by any of the MAC modules 310–330.

What is claimed is:

1. A system for determining forwarding information for a data frame received by a network device, comprising:
   a plurality of input ports configured to receive a plurality of data frames;
   queuing logic configured to transfer at least some of the received data frames to an external memory;
   a forwarding engine configured to generate forwarding information for at least some of the received data frames transferred by the queuing logic to the external memory; and
   a port filter configured to store forwarding information for one or more of the received data frames, analyze each of the received data frames to determine whether there is stored forwarding information relating to the received data frame, and, when there is stored forwarding information relating to the received data frame, using the stored forwarding information to forward the received data frame,
   wherein the port filter is further configured to mask the transferal of the received data frame by the queuing logic to the external memory causing the forwarding engine to ignore the transferal of the received data frame.

2. The system of claim 1, wherein the port filter includes:
   a programmable memory configured to store the forwarding information for the one or more received data frames.

3. The system of claim 2, wherein the forwarding information is stored in the programmable memory by a host device.

4. The system of claim 1, wherein the port filter includes:
   a lookup table configured to store identifying information relating to the one or more received data frames.

5. The system of claim 4, wherein the port filter is configured to compare a portion of each of the received data frames to the identifying information in the lookup table to determine whether there is stored forwarding information corresponding to the received data frame.

6. The system of claim 1, wherein the forwarding engine is further configured to bypass generation of forwarding information for the received data frame when the forwarding engine ignores the transferal of the received data frame.

7. The system of claim 1, wherein at least some of the one or more received data frames are related to each other.

8. The system of claim 7, wherein the related data frames correspond to data frames exchanged in a point-to-point communication.

9. A method for determining forwarding information for a data frame received by a network device, comprising:
   receiving, prior to receipt of one or more identified data frames at the network device, forwarding information for the one or more identified data frames from a source external to the network device;
   programming a memory to store the forwarding information for the one or more identified data frames;
   receiving a plurality of data frames;
   analyzing each of the received data frames to determine whether the received data frame corresponds to one of the one or more identified data frames;
   using the stored forwarding information to forward the received data frame when the received data frame corresponds to one of the one or more identified data frames;
   storing at least some of the received data frames in an external memory; and
   masking the storing of the received data frame in the external memory when the received data frame corresponds to one of the one or more identified data frames.

10. The method of claim 9, further comprising:
    generating forwarding information for the received data frame when the received data frame does not correspond to one of the one or more identified data frames.

11. The method of claim 9, wherein receiving the forwarding information includes:
    receiving the forwarding information from an external host device.

12. The method of claim 9, wherein the network device includes a lookup table configured to store identifying information for the one or more identified data frames; and
    wherein the analyzing each of the received data frames includes:
    comparing a portion of each of the received data frames to the identifying information in the lookup table to determine whether the received data frame corresponds to one of the one or more identified data frames.

13. A multiport network device, comprising:
    a memory configured to store forwarding information associated with one or more data frames;
    a lookup table configured to store identifying information relating to the one or more data frames;
    a plurality of input ports configured to receive a plurality of data frames;
    queuing logic configured to transfer at least some of the received data frames to an external memory;

a forwarding engine configured to generate forwarding information for at least some of the received data frames transferred by the queuing logic to the external memory; and a port filter configured to compare a portion of each of the received data frames to the identifying information stored in the lookup table to determine whether the received data frame is related to one of the one or more data frames for which the memory stores forwarding information, and, when the received data frame is related to one of the one or more data frames, prevent the forwarding engine from generating forwarding information for the received data frame and use the stored forwarding information to forward the received data frame, wherein the forwarding engine is configured to ignore transferal of the received data frame to the external memory when the port filter masks the transferal of the received data frame.

14. The multiport switch network device of claim 13, wherein a host device stores the forwarding information in the memory.

15. The multiport network device of claim 13, wherein the forwarding engine is further configured to bypass generation of forwarding information for the received data frame when the forwarding engine ignores the transferal of the received data frame.

16. A switch, comprising:

an interface configured to receive first frame forwarding information associated with certain data frames from a source external to the switch prior to receipt of the certain data frames at the switch;

a port filter configured to store the received first frame forwarding information;

a plurality of input ports configured to receive a plurality of data frames;

wherein the port filter is further configured to:
  identify the data frames of the received plurality of data frames that are the certain data frames,
  mask storing of ones of the received plurality of data frames in an external memory that are identified as the certain data frames,
  retrieve the stored first frame forwarding information associated with the certain data frames, and
  use the stored first frame forwarding information to forward the certain data frames; and a forwarding unit configured to:
  performing a forwarding lookup for data frames of the plurality of data frames not identified as the certain data frames to generate second frame forwarding information, and
  use the second frame forwarding information to forward the data frames not identified as the certain data frames.

* * * * *

UNITED STATES PATENT AND TRADEMARK OFFICE
CERTIFICATE OF CORRECTION

PATENT NO. : 7,079,533 B1 Page 1 of 1
APPLICATION NO. : 09/846280
DATED : July 18, 2006
INVENTOR(S) : Erimli et al.

It is certified that error appears in the above-identified patent and that said Letters Patent is hereby corrected as shown below:

In column 12, line 21, change "performing" to "perform"

Signed and Sealed this

Seventh Day of November, 2006

JON W. DUDAS
*Director of the United States Patent and Trademark Office*